United States Patent
Zhang et al.

(10) Patent No.: US 8,359,317 B2
(45) Date of Patent: Jan. 22, 2013

(54) METHOD AND DEVICE FOR INDEXING RESOURCE CONTENT IN COMPUTER NETWORKS

(75) Inventors: Ling Zhang, Shanghai (CN); Shen Yu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 12/371,712

(22) Filed: Feb. 16, 2009

(65) Prior Publication Data

US 2009/0248622 A1    Oct. 1, 2009

(30) Foreign Application Priority Data

Mar. 26, 2008  (CN) .......................... 2008 1 0084087

(51) Int. Cl.
*G06F 7/00* (2006.01)
*G06F 17/30* (2006.01)

(52) U.S. Cl. ........ 707/741; 707/796; 707/830; 715/234; 715/239; 715/760; 717/115; 717/118; 717/148

(58) Field of Classification Search .............. 707/999.2, 707/999.4, 741, 784, 706, 709, E17.017, 707/E17.084, E17.116, E17.117, E17.118, 707/E17.121, 796, 830; 715/234, 239, 760, 715/FOR. 223; 717/115, 118, 148
See application file for complete search history.

(56) References Cited

U.S. PATENT DOCUMENTS

| | | | |
|---|---|---|---|
| 6,088,698 A * | 7/2000 | Lipkin ................. | 707/E17.121 |
| 6,271,840 B1 * | 8/2001 | Finseth et al. ............... | 715/236 |
| 6,351,755 B1 * | 2/2002 | Najork et al. ................. | 715/206 |
| 6,418,453 B1 * | 7/2002 | Kraft et al. ............................ | 1/1 |
| 6,691,105 B1 * | 2/2004 | Virdy .................................... | 1/1 |
| 6,751,612 B1 * | 6/2004 | Schuetze et al. .............. | 707/709 |
| 7,076,108 B2 * | 7/2006 | Huang et al. ................. | 382/240 |
| 7,082,427 B1 * | 7/2006 | Seibel et al. .................. | 707/661 |
| 7,289,983 B2 | 10/2007 | Best et al. | |
| RE40,683 E * | 3/2009 | Perkins ................................. | 1/1 |
| 7,581,170 B2 * | 8/2009 | Baumgartner et al. ....... | 715/234 |

(Continued)

FOREIGN PATENT DOCUMENTS

| | | |
|---|---|---|
| TW | 539963 | 7/2003 |
| WO | WO 01/27793 | 4/2001 |

OTHER PUBLICATIONS

Khoussainov, Rinat, et al., "Automated Index Management for Distributed Web Search", CIKM '03, New Orleans, LA, Nov. 3-8, 2003, pp. 386-393.*

(Continued)

*Primary Examiner* — Anh Ly
(74) *Attorney, Agent, or Firm* — Thomas Grzesik; Fleit Gibbons Gutman Bongini & Bianco PL (57) ABSTRACT

A method and device index resource content in a computer network. The computer network includes at least a first computer as a search engine and at least a second computer as a resource content site where a resource content of a user is stored. A determination is made as to whether the resource content is linked to a user-defined indexing code. The user-defined indexing code is used to process the resource content to obtain a set of information describing the resource content. The user-defined indexing code is executed in response to determining that the resource content is linked to the user-defined indexing code. The set of information describing the resource content is obtained as an indexing result in response to the executing.

20 Claims, 4 Drawing Sheets

U.S. PATENT DOCUMENTS

| | | | |
|---|---|---|---|
| 7,664,734 B2* | 2/2010 | Lawrence et al. | 707/999.003 |
| 7,711,682 B2* | 5/2010 | Zhang | 707/771 |
| 7,818,324 B1* | 10/2010 | Held et al. | 707/741 |
| 7,840,045 B2* | 11/2010 | Guo et al. | 382/128 |
| 2003/0108248 A1* | 6/2003 | Huang et al. | 382/240 |
| 2004/0133564 A1* | 7/2004 | Gross et al. | 707/3 |
| 2005/0125412 A1* | 6/2005 | Glover | 707/10 |
| 2005/0234895 A1* | 10/2005 | Kramer | 707/3 |
| 2006/0059462 A1* | 3/2006 | Yamamoto | 717/115 |
| 2006/0195435 A1* | 8/2006 | Laird-McConnell et al. | 707/4 |
| 2006/0253462 A1* | 11/2006 | Gras | 707/10 |
| 2007/0073894 A1 | 3/2007 | Erickson et al. | |
| 2007/0100822 A1* | 5/2007 | Freeman et al. | 707/6 |
| 2007/0185841 A1* | 8/2007 | Jones et al. | 707/3 |
| 2007/0209080 A1* | 9/2007 | Ture et al. | 726/28 |
| 2008/0040325 A1* | 2/2008 | Sachs et al. | 707/3 |
| 2008/0077558 A1* | 3/2008 | Lawrence et al. | 707/3 |
| 2008/0114761 A1* | 5/2008 | Gross et al. | 707/6 |
| 2008/0133487 A1* | 6/2008 | Gross et al. | 707/3 |
| 2008/0175458 A1* | 7/2008 | Guo et al. | 382/131 |
| 2008/0178151 A1* | 7/2008 | Chan et al. | 717/115 |
| 2008/0306908 A1* | 12/2008 | Agrawal et al. | 707/3 |
| 2009/0083293 A1* | 3/2009 | Albrecht et al. | 707/100 |
| 2009/0094224 A1* | 4/2009 | Ricket et al. | 707/5 |
| 2010/0057802 A1* | 3/2010 | McKeeth | 707/734 |
| 2010/0070448 A1* | 3/2010 | Omoigui | 706/47 |
| 2010/0114904 A1* | 5/2010 | Virdy | 707/741 |

OTHER PUBLICATIONS

Wenyin, Liu, et al., "A Media Agent for Automatically Building a Personalized Semantic Index for Web Media Objects", Journal of the American Society for Information Science and Technology, vol. 52, No. 10, © 2001, pp. 853-855.*

Fontoura, Marcus, et al., "High Performance Index Build Algorithms for Intranet Search Engines", Proc. of the 30th VLDB Conf., Toronto, Canada, © 2004, pp. 1122-1133.*

Hersh, William, et al., "Maintaining a Catalog of Manually-Indexed, Clinically-Oriented World Wide Web Content", Proc. AMIA Symp., © 1999, pp. 790-794.*

Heydon, Allan, et al., "Mercator: A scalable, extensible Web crawler", World Wide Web 2, vol. 2, No. 4, Baltzer Science Publishers BV, © 1999, pp. 219-229.*

Theobald, Anja, et al., "The XXL Search Engine: Ranked Retrieval of XML Data using Indexes and Ontologies", ACM SIGMOD 2002, Madison, WI, Jun. 4-6, 2002, p. 615 (one page).*

Ester, Martin, et al., "Focused Web Crawling: A Generic Framework for Specifying the User Interest and for Adaptive Crawling Strategies", PaperID 219, CiteSeer, © 2001, pp. 1-10.*

Pokorny, Jaroslav, "Web Searching and Information Retrieval", Computing in Science and Engineering, vol. 6, Issue 4, IEEE Computer Society, Jul./Aug. 2004, pp. 43-48.*

Sergey Sosnovsky, Peter Brusilovsky, and Michael Yudelson—"Supporting Adaptive Hypermedia Authors with Automated Content Indexing"—University of Pittsburgh, School of Information Sciences 135 North Bellefield Avenue, Pittsburgh, PA 15260, USA {sas15, peterb, mvy3}@pitt.edu—Proceedings of Second . . . , 2004—dcs.warwick.ac.uk (pp. 1-84).*

Aurelie Neveol, Alexandrina Rogozan, and Stefan Darmoni—"Automatic indexing of online health resources for a French quality controlled gateway"—Information Processing and Management vol. 42, issue 3 May 2006—Received Oct. 19, 2004; accepted Jan. 5, 2005 Available online Mar. 2, 2005—(pp. 695-709).*

* cited by examiner

METHOD AND DEVICE FOR INDEXING RESOURCE CONTENT IN COMPUTER NETWORKS

CROSS-REFERENCE TO RELATED APPLICATIONS

This application is based upon and claims priority from prior Chinese Patent Application No. 200810084087 filed on Mar. 26, 2008, the disclosure of which is hereby incorporated herein by reference in its entirety.

FIELD OF THE INVENTION

The present invention generally relates to search engine technology, and more particularly to indexing resource content in a computer network.

BACKGROUND OF THE INVENTION

With the advancements of computer and Internet technology, search engines have become an important tool for Web client (e.g., computer) users to acquire information. A traditional search engine, such as Inktomi, Excite, Lycos, Infoseek and FAST, normally comprises a router for transmitting and receiving message packets between the Internet and a Web crawler server, an index server, and a Web server. The search engine uses the Web crawler (also known as a Web spider or Web robot) to access Web pages resources located by URLs (Uniform Resource Locators) on a regular basis, extracts textual information and other related attributes of the Web pages, and stores such information so that the index server may process the retrieved data. The index server parses the documents and creates a document index by applying an indexing algorithm, which normally involves creating a priority-ordered index based on keywords or other attributes of each document.

The Web server comprises a search application for processing search requests applied to the search engine. Generally, based on a keyword of interest provided by a user to the search engine, the search application makes use of the indexer to retrieve a pre-built index database to provide a keyword results page to the user, so as to help the user find and visit new URLs.

Search engines use various algorithms to create indices. A modem search engine may create an index based on both document contents and linkage information (e.g., Google's PageRank). When trying to find a document that is most relevant to a user query, the search engine applies a search algorithm to the document index and returns a match result. Generally, a search engine uses the same set of algorithms to rank documents. Most importantly, these algorithms are designed and maintained by a search service provider (e.g., Google or Yahoo!) itself. With respect to Web content owners, all they can do is to provide Web pages and leave the search engine to determine how a document index is created according to the content of the Web pages.

SUMMARY OF THE INVENTION

In view of the fact that generally all search engines in the prior art provide controlled indices, an object of the various embodiments of the present invention is to present a different search engine indexing technique which relates to a "user-contributed index" for Web search. Particularly, a user-defined indexing algorithm is provided in one or more of the various embodiments of the present invention to improve indexing quality and search quality.

According to one embodiment of the present invention, a method for indexing resource content in a computer network is disclosed. The computer network comprises at least a first computer as a search engine and at least a second computer as a resource content site where a resource content of a user is stored. The method includes determining whether the resource content is linked to a user-defined indexing code. The user-defined indexing code is used to process the resource content to obtain a set of information describing the resource content. The user-defined indexing code is executed in response to determining that the resource content is linked to the user-defined indexing code. The set of information describing the resource content is obtained as an indexing result in response to the executing.

If it is determined that there is no user-defined indexing code linked to by the resource content, a predetermined indexer (i.e. an indexing algorithm provided by the search service provider) is used to index the resource content. As an example, controlled indexing conducted on the search engine side or on the resource content site side.

If the method according to one embodiment present invention is implemented on the search engine side, the method further comprises: downloading the resource content and related information linked to by the resource content to the search engine, before the step of determining whether the resource content is linked to the user-defined indexing code.

The user-defined indexing code, in one embodiment, is implemented normally by a script file, and accordingly, the step of executing the user-defined indexing code is implemented by invoking a script engine.

The determination of whether the resource content is linked to the user-defined indexing code is implemented by parsing the resource content and verifying the related information linked to by the resource content.

In addition, if the method according to the one embodiment of the present invention is implemented on the resource content site side, it is required to determine in advance at the resource content site whether an access to the resource content is from a crawler of the search engine or from an average viewer; and if the access is from a crawler of the search engine, then further conduct the step of determining whether the resource content is linked to the user-defined indexing code.

The user-defined indexing code describes a self-defined weight defined by the user for an index term in the resource content, and the index term can be selected by the user. The user-defined indexing code, in one embodiment, is implemented by the user using content and/or organization of the resource content as an index term and assigning a weight to the index term.

In order for the user to obtain the user-defined indexing code conveniently, the user can be allowed to design the indexing code based on a code template. The code template corresponds to a content template of the resource content.

According to another embodiment, of the present invention, a device for indexing resource content in a computer network is disclosed. The computer network comprises at least a first computer as a search engine and at least a second computer as a resource content site where a resource content of a user is stored. The device is located on the search engine side and comprises:

A determination apparatus that is configured to receive the resource content and a set of related information linked to by the resource content that is downloaded by a crawler of the search engine. The determination apparatus is also configured to determine whether the set of related information linked to by the resource content contains user-defined indexing code. The user-defined indexing code is used to process the resource content so as to obtain information describing the resource content. An interpreter is configured to execute the user-defined indexing code and obtaining information describing the resource content as an indexing result.

The device may further comprise an index database storing the indexing result from the interpreter.

The device may further comprise a predetermined indexer. The predetermined indexer is configured to index the resource content if it is determined by the determination apparatus that there is no user-defined indexing code linked to by the resource content.

The user-defined indexing code, in one embodiment, is implemented by a script file and accordingly the interpreter is a script engine.

According to a further embodiment of the present invention, a device for indexing the resource content in a computer network is located on the resource content site side. Accordingly the determination apparatus is configured to determine whether related information linked to by the resource content contains user-defined indexing code. The interpreter is configured to execute the user-defined indexing code, so as to obtain information describing the resource content as an indexing result to be downloaded by the search engine.

The determination apparatus may be further configured to determine whether an access to the resource content is from a crawler of the search engine or from an average viewer. The determination apparatus can also be configured to determine whether the resource content is linked to the user-defined indexing code in response only to an access from a crawler of the search engine. Thus the overhead on the resource content site side is reduced.

The various embodiments of the present invention can be applied to either the Internet or a managed network environment. Due to the fact that the user or content owner understands the document (contents, layout, organization or other index terms) better than anyone else, a "user-contributed index" according to the various embodiments of the present invention allows every user or content owner to provide indexing code (i.e., indexing algorithm) that best describes a document based on an index term of interest, and therefore the "user-contributed index" in the various embodiments of the present invention may effectively help to improve indexing quality and thus search quality. Because indexing code provided by the content owner is especially trustworthy in a managed network environment, the various embodiments of the present invention can be applied to a managed network environment (e.g., an intranet).

BRIEF DESCRIPTION OF THE DRAWINGS

The above and other objectives, characteristics, and advantages of the present invention will be easily understood by reference to the following description of embodiments when read in conjunction with the accompanying drawings in which same or corresponding reference numerals refer to same or corresponding characteristics or parts.

DETAILED DESCRIPTION

Embodiments of the present invention will be described hereinafter with reference to the accompanying drawings. It should be noted that representations and descriptions of parts and processes irrelevant to the present invention or known to a person having ordinary skill in the art are omitted for clarity.

System Architecture

Figure 1:
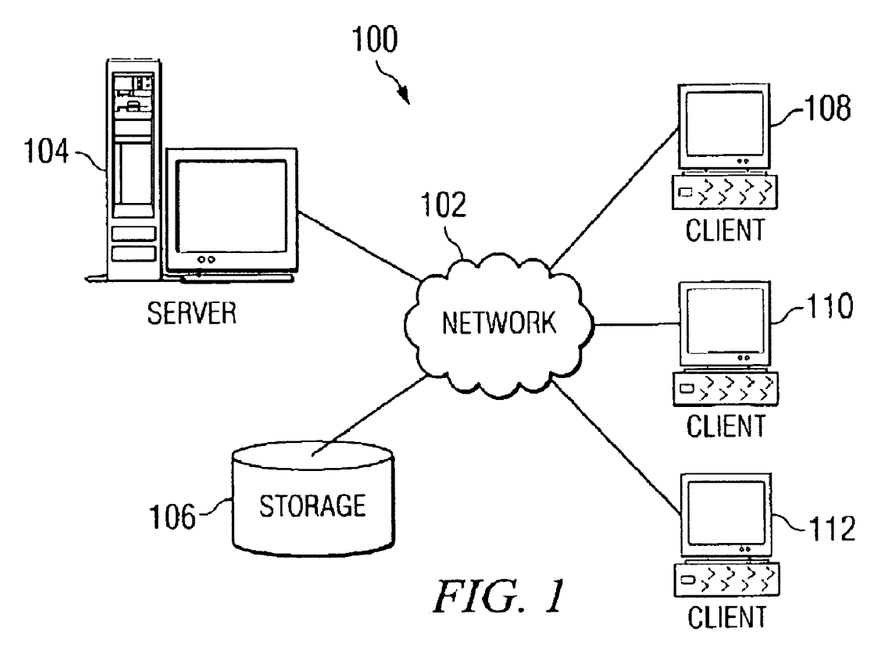
FIG. 1 is a block diagram of a distributed data processing system according to one embodiment of the present invention.

With reference now to the figures, in particular with reference to FIG. 1, a block diagram of a distributed data processing system in which one or more embodiments of the present invention may be implemented is depicted. A distributed data processing system 100 is a computer network in which one or more embodiments of the present invention may be implemented. The distributed data processing system 100 contains a network 102, which is the medium used for providing communication links between various devices and computers connected together within the distributed data processing system 100.

In the depicted example, a server 104 is connected to the network 102 along with a storage unit 106. In addition, clients 108, 110, and 112, like a work station, a personal PC, mobile phone, or PDA, also are connected to the network 102. In the depicted example, the server 104 provides data, such as boot files, operating system images, and applications to the clients 108, 110, and 112. The distributed data processing system 100 may comprise additional servers, clients, and other devices not shown. In the depicted example, the distributed data processing system 100 is the Internet, and the network 102 represents a collection of networks and gateways that use the TCP/IP protocol suite to communicate with one another. Of course, the distributed data processing system 100 may also be implemented as a number of different types of networks.

It should be noted that FIG. 1 is intended as an example, and not as an architectural limitation of the present invention. Many modifications to the system shown in FIG. 1 may be made without departing from the spirit and scope of the present invention. The various embodiments of the present invention may be implemented as the data processing system of the sever 104, which may be a symmetric multiprocessor (SMP) system including a plurality of processors connected to a system bus. Alternatively, a single processor system may be employed. The various embodiments of the present invention may also be implemented as the data processing system of the client computers in FIG. 1.

Method and Device for Indexing

A method for indexing resource content in a computer network is disclosed in one embodiment of the present invention. The computer network includes a computer as a search engine and a computer as a resource content site where a resource content of a user is stored. The method includes the following steps: determining whether the resource content is linked to the user-defined indexing code, the indexing code is used to process the resource content so as to obtain information describing the resource content; and executing the user-defined indexing code in response to determining that the resource content is linked to the user-defined indexing code, so as to obtain the information describing the resource content as an indexing result. The method according to the various embodiments of the present invention can be implemented either on the search engine side or on the resource content site side.

Figure 2:
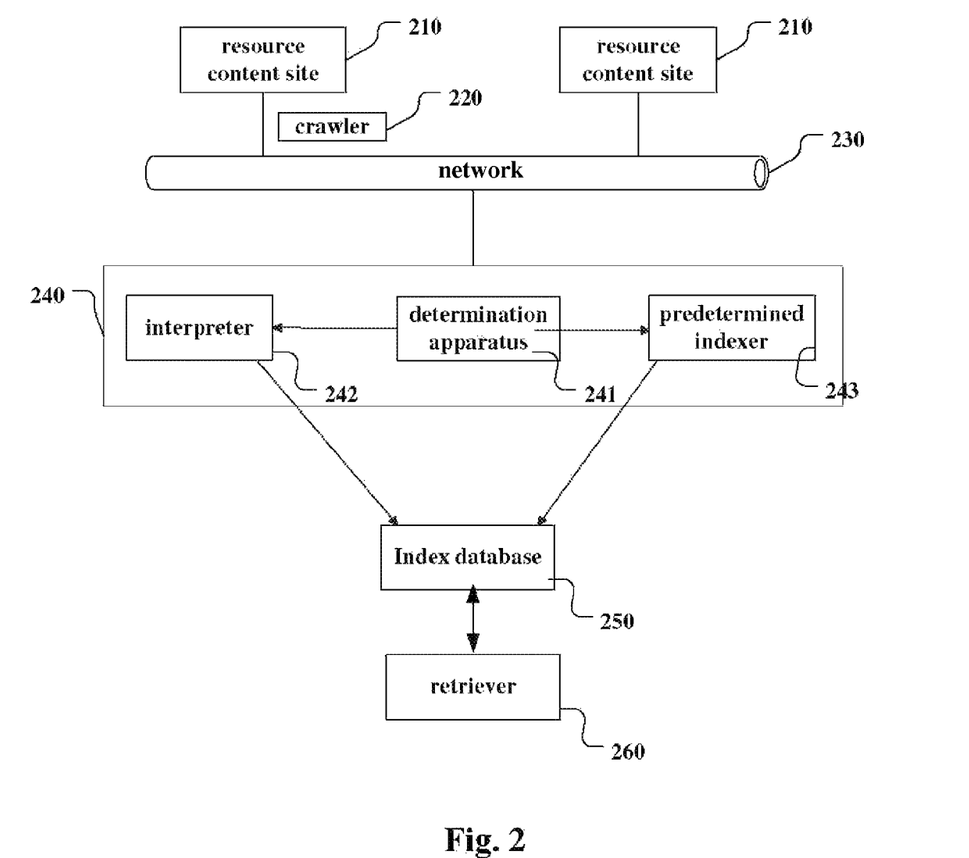
FIG. 2 is a block diagram of a system according to one embodiment of the present invention.

Accordingly, a device for indexing resource content in a computer network according one or more embodiments of the present invention includes: a determination apparatus, configured to determine whether the related information linked to by the resource content contains user-defined indexing code; and an interpreter, configured to execute the user-defined indexing code, so as to obtain the information describing the resource content as an indexing result One Embodiment FIG. 2 is a block diagram of a system in which an indexing device is implemented according to one embodiment of the present invention, including a resource content site 210, a crawler 220, a computer network 230, the indexing device 240, an index database 250, and a retriever 260. In this embodiment, the indexing device 240 is located on the search engine side, i.e., constituting a search engine together with the crawler 220, the index database 250, and the retriever 260. The indexing device can be located either in a search engine server or in an index server of the search engine.

At least one resource content site 210 stores resource content which may include various information such as HTML, XML, newsgroup articles, FTP files, word processing documents or multimedia information. Take a Web page as an example in this embodiment. Various related information linked to the Web page can be embedded in the Web page, and here we take a script file as an example in the embodiment. The script file may contain user-defined indexing code for implementing an indexing algorithm, and other scripts. The indexing code can be programmed in JavaScript, VBScript, or any other scripting language supported by a script engine on the search engine server side. Take JavaScript as an example in this embodiment.

The indexing code which the Web page is linked to implements the indexing algorithm for the Web page which contains the indexing code. For example, a wiki page may be embedded with a user-defined JavaScript indexing code by using the invocation code below:

```
< script type="text/javascript"
src="/wiki/pages/indexer/wiki-indexer.js"></script>
```

In the code above, script type="text/javascript" means that the scripting language of JavaScript is used; the filename (wiki-indexer.js) and address (/wiki/pages/indexer/wiki-indexer.js) are listed in src="/wiki/pages/indexer/wiki-indexer.js", which means that script file wiki-indexer.js will be invoked.

User-defined indexing code is functionally equivalent to a traditional indexer. Both of them are used to process a Web page in order to get information describing the Web page, and in particular, when being executed, they are both used to parse the Web page information obtained by a crawler, extract an index term from it, generate a representation document, and produce an index list of a document library. What is different is, user-defined indexing code according to the various embodiments of the present invention allows a user to select an index term of the resource content and to weight the selected index term by him/her. The user, or say content owner, understands the document (contents, layout, organization, etc.) better than anyone else, therefore a "user-defined index" according to the present invention may effectively improve indexing quality and thus search quality.

Normally, an index term may be an objective index term or content index term: objective index term is not related to the semantic content of a document, including name of author, URL, update time, coding, length, link popularity, etc.; content information reflects the content of the document, including keywords and their weights, phrases, words, etc. User-defined indexing code allows a user to design an indexing algorithm to best describe a document that can be based on index terms relating to contents and/or organization of the document. The user may assign a higher or lower weight to some of the index terms so as to complete his indexing code.

In one embodiment, a user may select contents or organization, e.g. a paragraph, emphasis and a section, as an index term. Increasing weight of some paragraph, some emphasis, or some section in the indexing code of the script file, which represents the differentiation degree of a document, helps to calculate the relevance of search results, so as to best describe the document. Thus, when the script file is executed later, the indexing code of the script file parses the source file of the Web page; identifies the predefined section; and assign a higher or lower weight to the text of this section.

In order for a user or content owner to conveniently design the JavaScript-based indexing code as discussed above, the user or content owner may first create a code template based on a content template, and alternatively, the user or content owner may be provided with a code template of any type and then he may assign a weight to an index term of interest or a particular index term. Each code template handles a different Web page (e.g., HTML) layout or content. Same indexing code can be used for Web pages of same type. Alternatively, indexing code can be individualized according to the content of an object. Based on the above description, a person having ordinary skill in the art may design individualized indexing code, or a code template for content templates of any type.

While accessing a Web page on the resource content side 210, the Web crawler 220 of the search engine downloads the Web page and a script file linked to by the Web page, and sends them back to the search engine side. The search engine includes the Web crawler 220, an indexing device 240, an index database 250, and a retriever 260. Alternatively, the index database 250 can be incorporated to the indexing device 240. The indexing device may include a determination apparatus 241, an interpreter 242, and a predetermined indexer 243.

Figure 3:
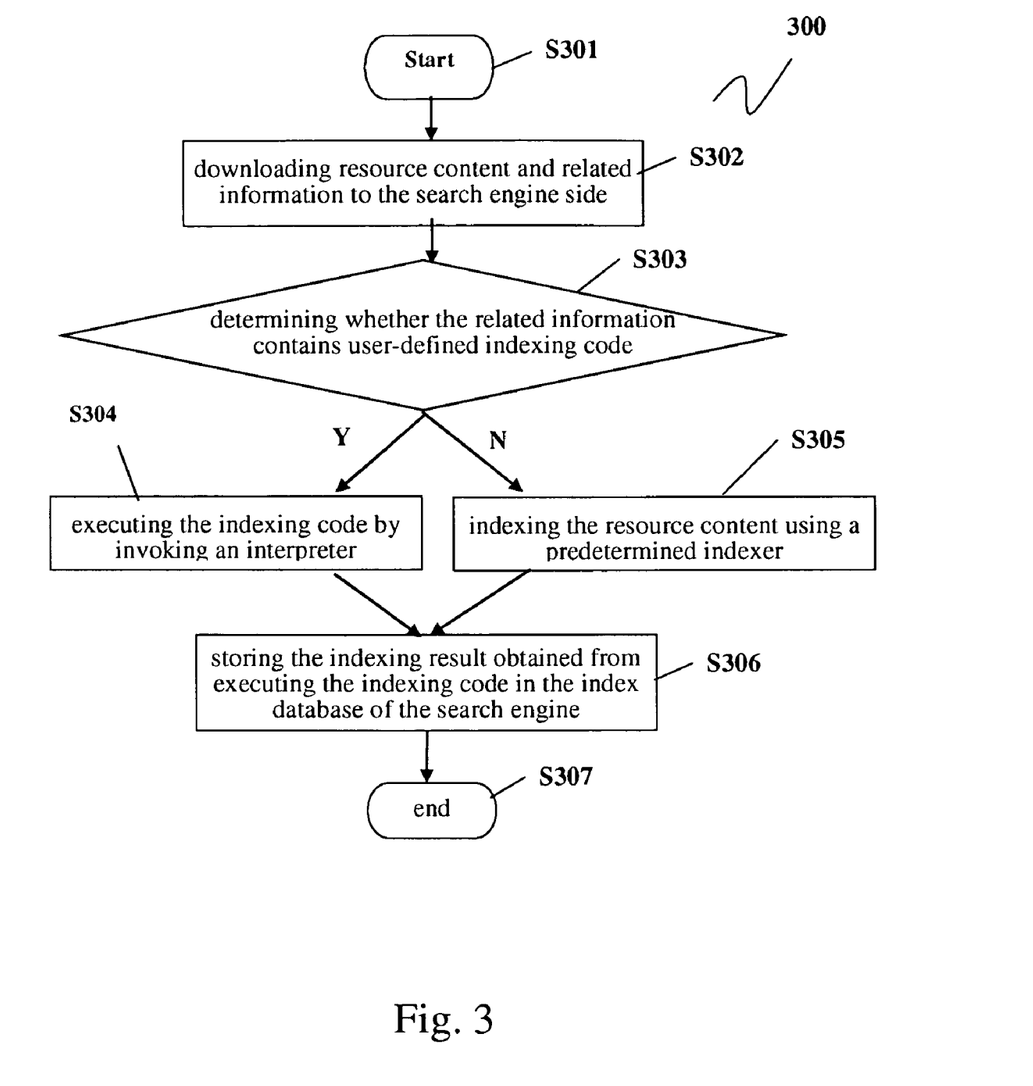
FIG. 3 is a flow chart of a method according to one embodiment of the present invention.

With reference now to FIG. 3, which is an operation flow diagram for an indexing process performed by the indexing device 240 is discussed. Starting at step S301, after the crawler 220 of the search engine downloads resource content (which is a Web page in this embodiment) and related information (which is a script file in this embodiment) linked to by the resource content at step S302, the determination apparatus 241 of the indexing device 240 parses the downloaded Web page and determines whether the Web page is linked to any user-defined indexing code (JavaScript code, as in the embodiment) (step S303). If the determination apparatus 241 determines at step S303 that the Web page is linked to user-defined indexing code, the interpreter 242 executes the user-defined indexing code (step S304) so as to obtain information describing the resource content as an indexing result and stores the result in the index database 250 (step S306), the process ends at step S307.

In particular, in order to determine whether indexing code is contained in the embedded script file, the determination apparatus 241 of the indexing device 240 is configured to verify the code in the script file. For example, the determination apparatus 241 can be configured to require the user-defined indexing code to comply with a uniform standard (e.g. a name standard). The determination apparatus 241 verifies the code in the script file linked to by the downloaded Web page; identifies the indexing code therein; and invokes the interpreter 242 to execute the identified indexing code.

The interpreter 242 (which is a script engine for the JavaScript indexing code in this embodiment), e.g. a Mozilla Rhino interpreter., is used to interpret and execute the indexing code in the Javascript code, and compile it to machine code executable by a computer. After invoked, the interpreter 242 interprets and executes the indexing code; opens the Web page related to the indexing code and performs parsing; identifies each part of the Web page, and extracts an index term according to a user-defined weight; so as to produce representative document and generate an index list of a document library. Thus, an output result from the indexing code in the script file is a document index of the Web page. The document index is to be stored in the index database 250.

If the determination apparatus 241 finds no indexing code or even no embedded JavaScript code in the downloaded Web page at step S303, the indexing device 240 uses a default indexing algorithm (the predetermined indexer 243) to index the Web page (step S305) and stores the indexing result in the index database 250 (step S306). Here the predetermined indexer 243 provides controlled indexing, and this predetermined indexer 243 is located, in one embodiment, in the indexing device 240. However, it should be noted that the predetermined indexer 243 is not necessarily required, because the present invention can be designed not to index resource content that is not linked to any user-defined indexing code. In addition, instead of being located in the indexing device 240, the predetermined indexer can be located in the search engine server separately or in the index server of the search engine. Upon receiving a search request, the retriever 260 of the search engine server retrieves the pre-built index database 250 according to a keyword provided by a user; evaluates the relevance of documents and the query; ranks results to be output; and generates a keyword-result page to be provided for the user.

An indexing method implemented in the Internet according to one or more embodiments of the present invention has been discussed above. To replace the controlled search engine indexing techniques, the indexing method according to the various embodiments of the present invention may take full advantage of a user or content owner's understanding of resource content, extract an index term according to a user-defined weight, and thus improve indexing quality and search quality.

Another Embodiment

The embodiment above describes an indexing method implemented in the Internet. A method according to another embodiment of the present invention may also be implemented in a managed network environment (e.g., an intranet). In a managed network environment, same processing steps can be performed as in the first embodiment. In an intranet, resource content (e.g., a Web document) is normally not linked to or referred to as it is in the Internet. Most of the documents are owned by departments and business units and are self-contained: few inbound links to documents owned by other departments and few outbound links from documents owned by other departments. Compared with in the Internet, Web linkage information is less useful in an intranet search, and Web content plays the most important role in search ranking. In addition, traditional intranet search normally cannot prevail over Internet-based Web search in quality due to lack of linkage information.

Therefore, the indexing method according to this embodiment can be implemented in intranet-based indexing, to replace current indexers in intranet search engines and work better. Furthermore, indexing code provided by a user or content owner in a managed intranet is more trustworthy than indexing code provided by an average user in the Internet, due to fraud in the Internet which attempts to temper ranking results. Therefore, a "user-contributed index" according to one or more embodiments of the present invention may effectively help to improve indexing quality and thus search quality in a managed network environment. In addition, intranet contents are normally well-organized. Therefore, a "user-contributed index" according to the various embodiments of the present invention may improve indexing quality and search quality by providing a standard indexing template for indexing.

An Additional Embodiment

Figure 4:
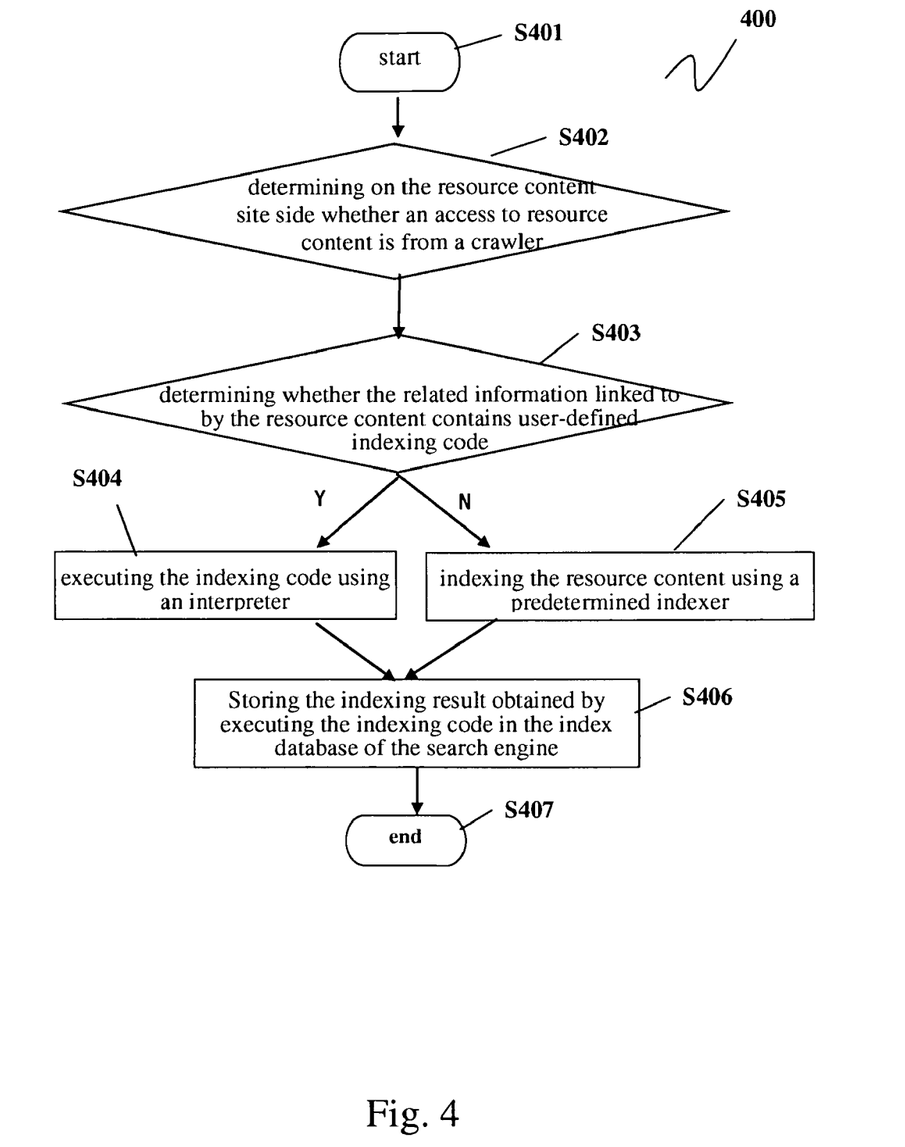
FIG. 4 is a flow chart of another method according to one embodiment of the present invention.

The embodiments discussed above disclose a technical solution which runs user-defined indexing code on the search engine side to produce indexing results. The present invention is not limited to this. Alternatively, a script file containing user-defined indexing code can be executed on the user side, i.e., the resource content side 210. FIG. 4 illustrates a flow chart of an indexing method according to the yet another embodiment of the present invention.

Starting at step S401, after providing a script file which is linked to by the resource content, the resource content site 210 determines whether an unknown access is from a crawler or from an average viewer by examining its request, head or by other mechanism that may identify a crawler (step S402). If the access is from a crawler, it is first determined whether related information (e.g., a script file) linked to by the resource content contains user-defined indexing code (step S403). If it contains user-defined indexing code a script engine of the resource content site 210 is invoked to execute the user-defined indexing code (step S404). The output result from the indexing code is then downloaded as an indexing result to the index database 250 of the search engine by the crawler (step S406) and the process ends at step S407. Thus, the workload on the search engine can be reduced and the efficiency can be improved.

If it is determined at step S403 that the access is not from a crawler, a predetermined indexer on the search engine side or even on the resource content site 210 can be used to index the resource content (step S405). For more information about a predetermined indexer on a resource content site, see International Patent Application WO/2001/027793 (herein referred to as "WO20012779", entitled "Indexing A Network With Agents".

In order to reduce the resource overhead on the user side, the indexing result can be recorded in a storage of the resource content site 210 after the user-defined indexing code is executed independently on the resource content site 210 side for the first time, or after the user-defined indexing code is executed in response to a crawler access for the first time. This is so that a same result can be provided for subsequent crawler accesses. If the resource content is updated, an updated indexing code of the resource content will be executed accordingly and indexing results will be updated.

Accordingly, an indexing device according to this embodiment can be located on the resource content site side, and includes similarly: a determination apparatus, configured to determine whether an access is from a crawler and determine whether related information linked to by the resource content contains user-defined indexing code; and a interpreter, configured to execute the user-defined indexing code, so as to obtain information describing the resource content as an indexing result to be downloaded by the crawler of the search engine. Since the user-defined indexing code is executed on the user side, i.e., the resource content site 210 in the third embodiment, and a script engine is normally configured on the user side, the interpreter 242 and corresponding interface components is not necessarily required, and accordingly the overhead of the whole system is reduced.

Other Embodiments

For those skilled in the art, it could be understood that any or all of the steps/components of the method and apparatus according to the invention may be implemented in form of hardware, firmware, software of any combination thereof in any computing equipment (including a processor and storing media and etc.) or any network of computing equipments, detailed description of which is omitted here because it could be implemented by those skilled in the art with his basic programming skills.

In addition, based on above understanding, the object of the invention may also be achieved by one application or one group of applications running on any information processing equipment, which may be well-known universal equipment. Therefore, the object of the invention may also be achieved by simply providing a program product comprising program codes capable of realizing the method or apparatus as described above. That is to say, such a program product constitutes one or more embodiments of the present invention, and any storing media with such a program product stored therein also constitutes the one or more embodiments of the present invention. Obviously, said storing medium may be any well-known storing medium or any storing medium developed in the future, therefore it is unnecessary to list all the storing media here.

In the method and apparatus according to the various embodiments of the present invention, obviously, the component or steps may be decomposed and/or re-combined. The decomposition and/or recombination should be regarded as equivalents of the various embodiments of the present invention. Various embodiments according of the present invention have been described above. Those skilled in the art should understand that the protection scope of the invention is not limited to the specific details disclosed herein, which may have various variations and equivalents within the spirit of the invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A method for indexing resource content in a computer network, the computer network comprising at least a first computer as a search engine and at least a second computer as a resource content site where a resource content of a user is stored, the method comprising:
   determining whether the resource content is linked to a user-defined indexing code, wherein the user is an owner of the resource content, and wherein the user-defined indexing code comprises executable code defined by the user that executes an indexing algorithm also defined by the user, wherein the indexing algorithm instructs the search engine on how to process the resource content to obtain a set of information describing the resource content as defined by the user, wherein user-defined indexing code is included within the resource content;
   executing the user-defined indexing code in response to determining that the resource content is linked to the user-defined indexing code; and
   obtaining, in response to the executing, the set of information describing the resource content as an indexing result.

2. The method according to claim 1, further comprising:
   storing the indexing result obtained upon executing the user-defined indexing code in an index database of the search engine.

3. The method according to claim 1, further comprising:
   in response to determining that the resource content fails to be linked to any user-defined indexing code, indexing the resource content by a predetermined indexer.

4. The method according to claim 1, further comprising:
   downloading the resource content and related information linked to by the resource content to the search engine prior to determining whether the resource content is linked to the user-defined indexing code, and wherein determining whether the resource content is linked to the user-defined indexing code and executing the user-defined indexing code are performed by the search engine.

5. The method according to claim 1, wherein determining whether the resource content is linked to the user-defined indexing code and executing the user-defined indexing code are performed by the resource content site.

6. The method according to claim 5, further comprising:
determining by the resource content site whether an access to the resource content is from a crawler of the search engine or from a human viewer; and
if the access is from a crawler of the search engine, further determining whether the resource content is linked to the user-defined indexing code.

7. The method according to claim 1, wherein the user-defined indexing code describes a self-defined weight defined by the user for an index term in the resource content.

8. The method according to claim 1, wherein the user-defined indexing code further comprises the user using at least one of content and organization of the resource content as an index term and weighting the index term.

9. The method according to claim 1, wherein the user-defined indexing code is obtained based on a code template, and the code template corresponds to a content template of the resource content.

10. The method according to claim 1, wherein the user-defined indexing code is implemented by a script file.

11. The method according to claim 1, wherein the computer network is a managed network environment.

12. An information processing system for indexing resource content in a computer network, the computer network comprising at least the information processing system and at least another information processing system as a resource content site where a resource content of a user is stored, the information processing system comprising:
memory;
a processor communicatively coupled to the memory;
a search engine communicatively coupled to the memory and the processor;
a determination apparatus communicatively coupled to the memory and the processor, the determination apparatus configured to receive the resource content and a set of related information linked to by the resource content that is downloaded by a crawler of the search engine, and to determine whether the set of related information linked to by the resource content comprises user-defined indexing code, wherein the user is an owner of the resource content, and wherein the user-defined indexing code comprises executable code defined by the user that executes an indexing algorithm also defined by the user, wherein the indexing algorithm instructs the search engine on how to process the resource content so as to obtain information describing the resource content as defined by the user, wherein user-defined indexing code is included within the resource content; and
an interpreter communicatively coupled to the memory and the processor, the interpreter configured to execute the user-defined indexing code and obtaining information describing the resource content as an indexing result.

13. The information processing system according to claim 12, further comprising:
an index database which is configured to store the indexing result from the interpreter.

14. The information processing system according to claim 12, further comprising:
a predetermined indexer, which is configured to index the resource content if the determination apparatus determines that there fails to be user-defined indexing code linked to by the resource content.

15. The information processing system according to claim 12, wherein the user-defined indexing code describes a self-defined weight defined by the user for an index term in the resource content.

16. The information processing system according to claim 12, wherein the user-defined indexing code is implemented by the user using at least one of content and organization of the resource content as an index term and assigning a weight to the index term.

17. The information processing system according to claim 12, wherein the user-defined indexing code is obtained based on a code template and the code template corresponds to a content template of the resource content.

18. The information processing system according to claim 12, wherein the computer network is a managed network environment.

19. A computer program product for indexing resource content in a computer network, the computer network comprising at least a first computer as a search engine and at least a second computer as a resource content site where a resource content of a user is stored, the computer program product comprising
a storage medium readable by a processing circuit and storing instructions for execution by the processing circuit for performing a method comprising:
determining whether the resource content is linked to a user-defined indexing code, wherein the user is an owner of the resource content, and wherein the user-defined indexing code comprises executable code defined by the user that executes an indexing algorithm also defined by the user that processes the resource content to obtain a set of information describing the resource content, wherein user-defined indexing code is included within the resource content;
executing the user-defined indexing code in response to determining that the resource content is linked to the user-defined indexing code;
obtaining, in response to the executing, the set of information describing the resource content as an indexing result; and
downloading the resource content and related information linked to by the resource content to the search engine prior to determining whether the resource content is linked to the user-defined indexing code, and wherein determining whether the resource content is linked to the user-defined indexing code and executing the user-defined indexing code are performed by the search engine.

20. The computer program product according to claim 19, wherein the method further comprises:
determining whether an access to the resource content is from one of a crawler of the search engine and from a human viewer; and
determining whether the resource content is linked to the user-defined indexing code in response to the access from the crawler of the search engine.

* * * * *